UNITED STATES PATENT OFFICE 2,649,452

SOLUBLE VAT DYES OF THE ACRIDONE SERIES

William B. Hardy and Elizabeth M. Hardy, Bound Brook, N. J., assignors to American Cyanamid Company, New York, N. Y., a corporation of Maine No Drawing. Application January 17, 1951, Serial No. 206,516

8 Claims. (Cl. 260—276)

This invention relates to new disulfuric half-esters of leuco dyes of the anthraquinone acridone series and a process of preparing them.

Soluble esters, such as sulfuric acid half-esters, of vat dyes have achieved an important status in the art, as they permit the dyeing of materials which are not readily dyed by the ordinary vat dyeing processes. A number of processes have been developed for preparing the esters; however, there is an important class of vat dyes, namely, those of the anthraquinone acridone series, which have not been esterifiable hitherto by any practical process. When it is attempted to follow the procedures used in esterifying ordinary vat dyes, products of unknown constitution and low stability result which are not the disulfuric half-esters of the vat dyes.

A typical procedure is the well-known anhydrous reduction of a vat dye with a metal such as copper, and concurrent esterification with a sulfur trioxide addition product of pyridine. This is not successful with the anthraquinone acridone type because although an ester is formed, it is not the disulfuric ester of the leuco dyestuff, but an unstable monoester which cannot be used for dyeing because the dyestuff is not regenerated on the fiber by any ordinary technique used with sulfuric half-esters of that dyestuff. Similarly, the use of methyl sulfuric acid chloride does not produce the diester, but produces a product which is unsuitable for dyeing purposes.

Another proposed solution, which indicates the length to which the art has gone in its unsuccessful efforts to solve this problem, consisted in the preparation of sulfonic acids of the acridone carbonyl, having the structure

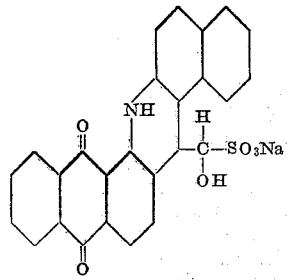

This required an elaborate synthesis via a phosphoric ester, as described on pp. 178–9 of British Intelligence Objectives Sub-Committee Final Report 987. It has proved too expensive to have any practical importance.

According to the present invention, the disulfuric half-esters of the leuco anthraquinone acridones are produced and in the form of their salts have the following formula:

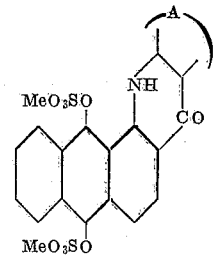

where A represents an isocyclic aromatic residue containing no more than three rings and Me is the monovalent cation of hydrogen or an alkali metal such as sodium, lithium, or potassium. These new disulfuric esters are stable, generally colorless to light brown, readily soluble in water to produce stable solutions, and excellently suited for dyeing vegetable or animal fibers by the procedures well known to the art for the use of sulfuric half-esters of other leuco vat dyes of the anthraquinone class.

The new compounds are prepared by reacting the corresponding intermediate 1-arylamino-2-carboxyanthraquinones by the usual methods of producing sulfuric half-esters, namely, reduction of the anthraquinone to the leuco form and reaction with a sulfur trioxide addition product of a tertiary amine. Surprisingly, by some mechanism which is not at present fully understood, the esterification results in cyclization to form the acridone. The resulting products are the disulfuric half-esters of the leuco anthraquinone acridone dyestuff. They have the properties described above and do not in any way resemble the unstable esters which were produced in the past and which are not suitable for dyeing.

The process of the present invention not only has the advantage of producing for the first time the new esters, but it eliminates one step, effecting esterification and cyclization in the same operation.

The present invention, as far as the new disulfuric half-esters are concerned, is not limited to any process of making them and includes both aqueous and non-aqueous processes. The former, however, is not claimed herein as it forms the subject matter of our copending application Serial No. 206,517, filed January 17, 1951. In the present application, however, there are claimed modifications of the general anhydrous esterification method which modifications are necessary to produce the disulfuric half-esters of the anthraquinone acridones. The modifications are of two types: first, in the reduction step a reducing metal selected from the group consisting of iron, zinc, and cadmium must be employed, other metals having been found to be unsuitable. The second modification is that the esterifying agent must be a sulfur trioxide compound of a strong tertiary base, that is to say, an amine having a dissociation constant of at least $1 \times 10^{-7}$. Among typical strong tertiary bases are the lower alkylamines, such as triethylamine, tripropylamine, tributylamine. Tertiary amines containing certain cyclic groups are also useful, such as dimethylcyclohexylamine, dimethylbenzylamine and the like. Tertiary saturated heterocyclic amines are also suitable, such as N-ethylmorpholine, N-methylpiperidine and the like. Sulfur trioxide addition products of weaker amines such as pyridine, are not suitable as they do not produce pure stable disulfuric half-esters when used under ordinary conditions in spite of the fact that the sulfur trioxide addition products of these weaker tertiary bases have been used extensively in industry in the production of sulfuric half-esters of ordinary leuco vat dyestuff. Just why the sulfur trioxide addition products of the stronger bases are necessary in the present invention has not been fully determined and the invention is not intended to be limited to any theory of action. It is possible that the greater stability of the sulfur trioxide addition products may play a part in cyclization.

It is advantageous to use an inert organic solvent in the reaction mixture. Typical of such solvents are aromatic hydrocarbons such as toluene; chlorinated aromatics such as chlorobenzene; chlorinated paraffins such as tetrachloroethane, and aromatic ethers such as anisole. It has also been found advantageous to have the sulfur trioxide addition product of the amine present in excess sufficient to destroy the water liberated by the ring closure reaction.

Except for the modifications set out above, the well-known procedures of anhydrous esterification may be followed; for example, it is not necessary to form the sulfur trioxide addition product of the strong tertiary base before the latter is added to the reaction medium. It is possible to prepare these addition compounds in situ by reacting the amine with chlorosulfonic acid in the reaction mixture. The reaction proceeds and the product is isolated in the usual manner as applied to other types of leuco vat dyestuffs. It is an advantage that no special precautions are necessary to insure cyclization and it is not known with any certainty whether the esterification and cyclization occur simultaneously or separately in any particular order. The behavior of the reaction makes it seem probable that the two reactions proceed at the same time, but the invention is not limited to any such theory.

This procedure is broadly applicable to intermediates of the formula:

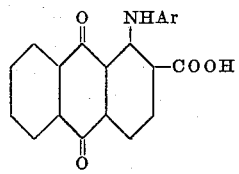

in which Ar is an isocyclic aromatic radical containing less than 4 rings, and contains a free position ortho to the —NH— linkage (to make acridone cyclization possible). Typical examples of these intermediates are 1-anilino-2-carboxyanthraquinone; its substitution products such as the 1-p-anisidino and 1-p-toluidino-2-carboxyanthraquinone; products substituted in the anthraquinone nucleus, such a 6-chloro-1-anilino-2-carboxyanthroquinone, 5-benzoylamino-1-p-toluidino-2-carboxyanthraquinone, etc. Other examples are 1-naphthylamino-2-carboxyanthraquinone, 2-carboxy-1,2'-dianthrimide, and their substitution products. Halogen and nitro groups appear to deactivate the intermediate products to some extent and if there are too many of these groups present in a single molecule, cyclization is impeded and yields are lower and the reaction proceeds less smoothly. The present invention will be illustrated in greater detail in conjunction with the following specific examples, the parts being by weight unless otherwise indicated:

Example 1

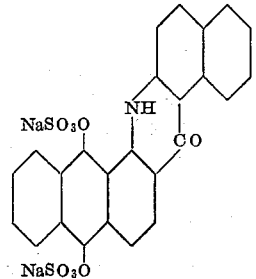

To a mixture of 87 parts of trimethylamino and 390 parts of chlorobenzene at a temperature of 5–10° C., there is slowly added 85 parts of chlorosulfonic acid. The resulting slurry is brought to room temperature under a nitrogen atmosphere, and there is added to it 31 parts of 1(β-naphthylamino)-2-carboxyanthraquinone. 16.5 parts of zinc are then added in portions at a temperature of 50° C. with stirring. The stirring is maintained after the addition of all the zinc until the reaction is substantially complete. The resulting purple reaction mixture is drowned in a solution of 220 parts of sodium carbonate and 900 parts of sodium hydroxide in about 3500 parts of water, then being distilled under reduced pressure to remove the chlorobenzene and trimethylamine. The residual slurry is filtered and the product salted out from the filtrate.

Example 2

A mixture of 280 parts of chlorobenzene and 101 parts of triethylamine is stirred at 10° C. and treated with 58 parts of chlorosulfonic acid. The slurry thus obtained is allowed to come to room temperature and then treated under nitrogen atmosphere with 49 parts of 1(β-naphthylamino-2-carboxyanthraquinone. This is followed by the gradual addition of 28 parts of cadmium, during which the purple slurry gradually turns redder in color. The mixture is then treated with 91 parts of the sulfur trioxide addition product of triethylamine and stirred until the reaction has substantially ceased.

The resulting slurry is drowned in a solution of 150 parts of sodium carbonate and 1000 parts of sodium hydroxide in about 3500 parts of water, then being distilled under reduced pressure to remove triethylamine and chlorobenzene. The residue is filtered and salted with sodium chloride. An excellent yield of product is obtained.

*Example 3*

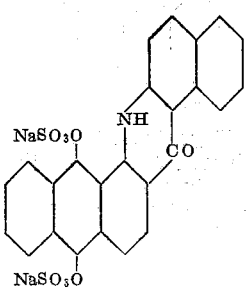

A mixture of 101 parts of triethylamine and 280 parts of chlorobenzene is cooled to approximately 10° C., stirred, and treated gradually with 58 parts of chlorosulfonic acid. The resulting slurry is warmed to room temperature. There is then added 49 parts of 1(β-naphthylamino)-2-carboxyanthraquinone. The mixture is then heated to 50-60° C. under a nitrogen atmosphere, stirred and gradually treated with 16.5 parts of zinc dust. To the resulting dark brown reaction product is added 91 parts of the sulfur trioxide addition product of triethylamine. The mixture is then poured into 3000 parts of water containing 150 parts of sodium carbonate and 360 parts of 5N sodium hydroxide, and freed of triethylamine and chlorobenzene by distillation under reduced pressure. The residual liquor is clarified by filtration, and treated with sodium chloride to salt out the product, which is washed with 20% sodium chloride solution. An excellent yield is obtained.

*Example 4*

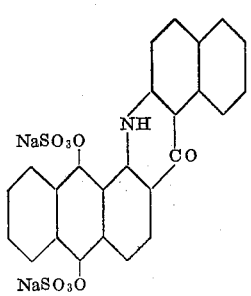

A mixture of 143 parts of tripropylamine and 280 parts of chlorobenzene is cooled to 5–10° C. and stirred while there is gradually added 58 parts of chlorosulfonic acid. The product is then brought to room temperature, and 49 parts of 1(β - naphthylamino) - 2 - carboxyanthraquinone is added to it. The resulting purple slurry is heated to about 60° C. under a nitrogen atmosphere and treated in portions with 14 parts of powdered iron. Stirring is continued at this temperature until reaction ceases. The reaction mixture is then drowned in a solution of 15 parts of sodium carbonate and 6 parts of sodium hydroxide in about 3250 parts of water. The tripropylamine and chlorobenzene are removed by steam distillation at reduced pressure. The residue is filtered and the product salted out by the addition of sodium chloride.

*Example 5*

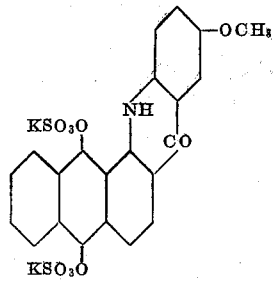

58 parts of chlorosulfonic acid is gradually added at 10° C. to a mixture of 280 parts of chlorobenzene and 101 parts of triethylamine. This is followed at room temperature by 47 parts of 1(p-anisidino)-2-carboxyanthraquinone. The mixture is then heated to 50° C., and gradually treated under an atmosphere of nitrogen with 16.5 parts of zinc dust. The purple slurry becomes thinner during the course of the reaction. There is then added 91 parts of triethylamine-sulfur trioxide. The resulting red-brown mixture is stirred at 50° C. until the reaction is complete, and then poured into 2000 parts of water containing 150 parts of sodium carbonate and 340 parts of 5N sodium hydroxide. The triethylamine and chlorobenzene are removed by distillation. The residual liquor is filtered, and the product salted out with potassium chloride. A high yield is obtained.

*Example 6*

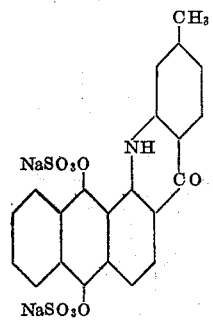

A mixture of 280 parts of chlorobenzene and 101.1 parts of triethylamine is stirred at 10–15° C. and gradually treated with 58 parts of chlorosulfonic acid. The resulting slurry is brought to room temperature and treated with 45 parts of 1(m-toluidino)-2-carboxyanthraquinone. The slurry is heated to about 50° C. under a nitrogen atmosphere and treated with 16 parts of zinc dust, in portions, followed by 91 parts of the sulfur trioxide addition product of triethylamine. Stirring is then continued until the reaction is complete. The resulting oily reaction mixture is poured into 2500 parts of water containing 150 parts of sodium carbonate and 340 parts of 5N sodium hydroxide solution. The triethylamine and chlorobenzene are removed by distillation under reduced pressure. The residue is filtered and salted with sodium chloride to precipitate the product. The yield is substantially quantitative.

Example 7

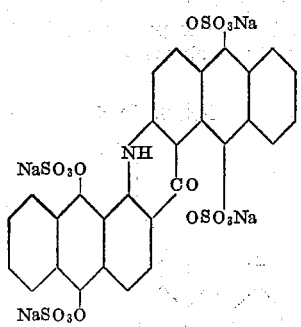

A mixture of 202 parts of triethylamine and 550 parts of chlorobenzene is treated gradually at a temperature of 5–10° C. with 116 parts of chlorosulfonic acid. The slurry is warmed to room temperature and treated with 58 parts of 2-carboxy-1,2'-dianthrimide. The resulting orange red slurry is heated to 50° C., stirred under nitrogen, and gradually treated with 33 parts of zinc dust, during which the reaction mixture becomes first thicker and then thinner. 181 parts of triethylamine-sulfur trioxide is then added and the slurry stirred at 50° C. until the reaction is complete. It is poured into a solution of 300 parts of sodium carbonate and 720 parts of 5N sodium hydroxide in 5000 cc. of water, and then freed of triethylamine and chlorobenzene by distillation under reduced pressure. The residual slurry is filtered and the desired leuco ester is found in the filtrate, from which it can be isolated or converted to the acridone dyestuff by hydrolysis followed by oxidation.

Example 8

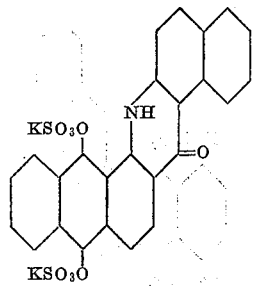

A mixture of 98 parts of 1-(β-naphthylamino)-2-carboxyanthraquinone, 400 parts of water, 212 parts of sodium carbonate, 10 parts of dimethylaniline, and 100 parts of 40% sodium xylene sulfonate solution is stirred in a nitrogen atmosphere at 50° C. and treated at this temperature with 58 parts of sodium hydrosulfite and 272 parts of the sulfur trioxide addition product of triethylamine. After all the addition product has been added, the reaction mixture is stirred until reaction is complete, treated with 600 parts of 20% sodium hydroxide solution, and freed of triethylamine and dimethylaniline by distillation under reduced pressure. The residue is aerated to oxidize any unesterified product, and filtered. The product is salted out from the filtrate by the addition of potassium chloride. The leuco diester thus obtained is washed with 20% potassium carbonate solution and dried.

Example 9

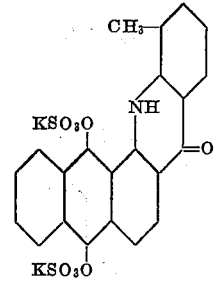

A mixture of 45 parts of 1-(o-toluidino)-2-carboxyanthraquinone, 200 parts of water, 50 parts parts of 40% sodium xylenesulfonate solution, 7 parts of dimethylaniline and 106 parts of sodium carbonate is stirred in a nitrogen atmosphere at 50° C., and treated with 29 parts of sodium hydrosulfite and 136 parts of the sulfur trioxide addition product of triethylamine. After all the addition product has been added, the reaction mixture is stirred until reaction is complete. The mixture is then treated with 240 parts of 5N sodium hydroxide solution, freed of triethylamine by distillation, diluted, aerated, and filtered. The product is salted from the filtrate by the addition of potassium chloride, filtered, and dried. It may be purified by redissolving and resalting.

We claim:

1. A leuco anthraquinone acridone disulfuric half-ester of the formula

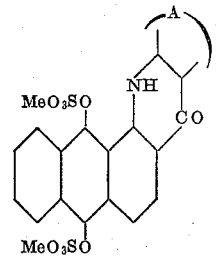

where A represents an isocyclic aromatic residue containing no more than three rings, and Me is a monovalent cation.

2. A leuco anthraquinone benzacridone disulfuric half-ester of the formula

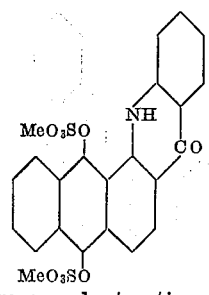

where Me is a monovalent cation.

3. A leuco anthraquinone naphthacridone disulfuric half-ester of the formula

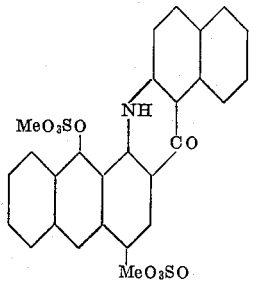

in which Me is a monovalent cation.

4. A process of converting a 1-arylamino-2-carboxyanthraquinone to the disulfuric half-ester of the leuco form of the corresponding acridone vat dyestuff, by subjecting it to treatment with a metal selected from the class consisting of zinc, iron, and cadmium, and the sulfur trioxide addition product of a tertiary amine of dissociation constant at least $1 \times 10^{-7}$.

5. A process according to claim 4 in which the reaction mixture contains an inert organic solvent and the tertiary amine is a trialkyl amine.

6. A process according to claim 5 in which the metal is zinc.

7. A process according to claim 6 in which the 1-arylamino-2-carboxyanthraquinone is 1-β-naphthylamino.

8. A process according to claim 7 in which the trialkyl amine is triethylamine.

WILLIAM B. HARDY.
ELIZABETH M. HARDY.

References Cited in the file of this patent

UNITED STATES PATENTS

| Number | Name | Date |
|---|---|---|
| 2,035,362 | Bauer et al. | Mar. 24, 1936 |
| 2,164,782 | Prahl et al. | July 4, 1939 |